(12) United States Patent
Bienas et al.

(10) Patent No.: US 10,057,755 B2
(45) Date of Patent: *Aug. 21, 2018

(54) COMMUNICATION DEVICES AND METHODS FOR NETWORK SIGNALING

(71) Applicant: INTEL DEUTSCHLAND GMBH, Neubiberg (DE)

(72) Inventors: Maik Bienas, Schöppenstedt (DE); Andreas Schmidt, Braunschweig (DE); Hyung-Nam Choi, Hamburg (DE)

(73) Assignee: INTEL DEUTSCHLAND GMBH, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/453,552

(22) Filed: Mar. 8, 2017

(65) Prior Publication Data

US 2017/0180974 A1 Jun. 22, 2017

Related U.S. Application Data

(63) Continuation of application No. 15/150,657, filed on May 10, 2016, now Pat. No. 9,635,567, which is a continuation of application No. 13/043,606, filed on Mar. 9, 2011, now Pat. No. 9,374,767.

(51) Int. Cl.
*H04W 8/00* (2009.01)
*H04W 88/04* (2009.01)
*H04W 88/06* (2009.01)

(52) U.S. Cl.
CPC ............ *H04W 8/005* (2013.01); *H04W 88/04* (2013.01); *H04W 88/06* (2013.01)

(58) Field of Classification Search
None
See application file for complete search history.

(56) References Cited

U.S. PATENT DOCUMENTS

| 6,510,146 | B1 | 1/2003 | Korpela et al. |
| 8,902,855 | B2 | 12/2014 | Etemad et al. |
| 8,989,807 | B2 | 3/2015 | Schmidt |

(Continued)

FOREIGN PATENT DOCUMENTS

| CN | 1732651 A | 2/2006 |
| CN | 101588582 A | 11/2009 |

(Continued)

OTHER PUBLICATIONS

Pragada et al.; "Method and Apparatus for Performing Device-to-Device (D2D) Service Advertising and Discovery," U.S. Appl. No. 61/639,386, filed Apr. 27, 2012; 69 pages.

(Continued)

*Primary Examiner* — Diane Lo
(74) *Attorney, Agent, or Firm* — Schwabe, Williamson & Wyatt, P.C.

(57) ABSTRACT

A communication device is described comprising a detector configured to detect, based on the reception of radio signals from another communication device, whether the other communication device is operating as a relay communication device in a radio cell associated with the communication device and a signaling circuit configured to signal to a communication terminal that the other communication device is operating as a relay communication device if it has been detected that the other communication device is operating as a relay communication device.

25 Claims, 12 Drawing Sheets

(56) References Cited

U.S. PATENT DOCUMENTS

| | | |
|---|---|---|
| 2004/0077374 A1 | 4/2004 | Terry |
| 2004/0121766 A1 | 6/2004 | Benson et al. |
| 2005/0036469 A1 | 2/2005 | Wentink |
| 2007/0004404 A1 | 1/2007 | Buckley et al. |
| 2007/0076608 A1 | 4/2007 | Samuel et al. |
| 2008/0075035 A1 | 3/2008 | Eichenberger |
| 2008/0205345 A1 | 8/2008 | Sachs et al. |
| 2008/0273500 A1 | 11/2008 | Suh |
| 2009/0141684 A1 | 6/2009 | Hashimoto et al. |
| 2009/0180451 A1 | 7/2009 | Alpert et al. |
| 2009/0286542 A1 | 11/2009 | Gideon et al. |
| 2010/0009675 A1 | 1/2010 | Wijting et al. |
| 2010/0142433 A1 | 6/2010 | Womack et al. |
| 2010/0165882 A1 | 7/2010 | Palanki et al. |
| 2010/0197304 A1 | 8/2010 | Sawhney et al. |
| 2010/0248715 A1 | 9/2010 | Lundsgaard et al. |
| 2010/0261469 A1 | 10/2010 | Ribeiro et al. |
| 2011/0038318 A1 | 2/2011 | Parsons et al. |
| 2011/0082940 A1 | 4/2011 | Montemurro et al. |
| 2011/0222424 A1 | 9/2011 | Abishek et al. |
| 2011/0244800 A1 | 10/2011 | Bogestam et al. |
| 2011/0258327 A1 | 10/2011 | Phan et al. |
| 2012/0172045 A1 | 7/2012 | Fukuta |
| 2012/0213183 A1 | 8/2012 | Chen et al. |
| 2012/0252498 A1 | 10/2012 | Trinchero et al. |
| 2013/0034082 A1 | 2/2013 | Etemad et al. |
| 2013/0184024 A1 | 7/2013 | Chen et al. |
| 2013/0316727 A1 | 11/2013 | Edge |
| 2014/0004796 A1 | 1/2014 | Cakulev et al. |
| 2014/0243039 A1 | 8/2014 | Schmidt et al. |
| 2014/0328287 A1 | 11/2014 | Etemad et al. |
| 2014/0335791 A1 | 11/2014 | Kim et al. |
| 2016/0278154 A1 | 9/2016 | Schmidt et al. |

FOREIGN PATENT DOCUMENTS

| | | | |
|---|---|---|---|
| EP | 1328093 | A1 | 7/2003 |
| EP | 181725 | A1 | 1/2008 |
| JP | 11075237 | A | 3/1999 |
| WO | 2004103008 | A1 | 11/2004 |
| WO | 2010006650 | A1 | 1/2010 |
| WO | 2013012371 | A1 | 1/2013 |
| WO | 2013019816 | A1 | 2/2013 |
| WO | 2013163599 | A2 | 10/2013 |
| WO | 2014131536 | A1 | 9/2014 |

OTHER PUBLICATIONS

Advisory Action dated Sep. 28, 2016 from U.S. Appl. No. 15/145,370, 9 pages.
Final Office Action dated Jul. 18, 2017 from U.S. Appl. No. 15/145,370, 23 pages.
United States Patent Office; Office Action dated Feb. 16, 2017 for U.S. Appl. No. 15/145,370; 17 pages.
European Patent Office; Office Action dated Jun. 14, 2017 for Patent Application No. 14702199.2; 78 pages.
European Patent Office; Office Action dated Oct. 4, 2016 for Patent Application No. 14702199.2; 7 pages.
European Patent Office; Office Action dated Apr. 4, 2017 for Patent Application No. 12820557.2; 3 pages.
First Office action in Chinese Patent Application No. 201210060928, dated Mar. 4, 2014, including English translation, pp. 1-18 of and Chinese, pp. 19-26, totaling 26 pages.
Chinese Patent Office; Second Office Action for Chinese App. No. 201210060928, dated Dec. 18, 2014; 26 pages inclusive of English translation.
German Patent Office; Office Action for German App. No. 102012101863.4, dated Jun. 30, 2015; 18 pages. inclusive of English translation.
3GPP TS 36.300 V10.7.0 (Mar. 2012); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; (Release 10); pp. 1-194.
3GPP TS 36.331 V10.5.0 (Mar. 2012); 3rd Generation Partnership Project; Technical Specification Group Radio Access Network; Evolved Universal Terrestrial Radio Access (E-UTRA); Radio Resource Control (RRC); Protocol specification; (Release 10); pp. 1-302.
3GPP TS 36.101 V10.6.0 (Mar. 2012); 3rd Generation Partnership Project; Technical Specification Group Radio Access Network; Evolved Universal Terrestrial Radio Access (E-UTRA); User Equipment (UE) radio transmission and reception (Release 10); pp. 1-312.
3GPP TR 22.803 V0.3.0 (May 2012); 3rd Generation Partnership Project; Technical Specification Group SA; Feasibility Study for Proximity (ProSe) (Release 12); pp. 1-24.
3GPP TS 36.306 V10.1.0 (Mar. 2011); 3rd Generation Partnership Project; Technical Specification Group Radio Access Network; Evolved Universal Terrestrial Radio Access (E-UTRA); User Equipment (UE) radio access capabilities; (Release 10); pp. 1-18.
3GPP TS 36.304 V10.5.0 (Mar. 2012); 3rd Generation Partnership Project; Technical Specification Group Radio Access Network; Evolved Universal Terrestrial Radio Access (E-UTRA); User Equipment (UE) procedures in idle mode (Release 10); p. 1-33.
3GPP TS 36.321 V10.5.0 (Mar. 2012); 3rd Generation Partnership Project; Technical Specification Group Radio Access Network; Evolved Universal Terrestrial Radio Access (E-UTRA); Medium Access Control (MAC) protocol specification.
3GPP TR 22.803 V1.0.0 (Aug. 2012); 3rd Generation Partnership Project; Technical Specification Group SA; Feasibility Study for Proximity (ProSe) (Release 12); pp. 1-33.
3GPP TS 36.306 V09.2.0 (Jun. 2010); 3rd Generation Partnership Project; Technical Specification Group Radio Access Network; Evolved Universal Terrestrial Radio Access (E-UTRA); User Equipment (UE) radio access capabilities; (Release 9); pp. 1-16.
International Search Report and Written Opinion in related PCT Application No. PCT/EP2014/050415, dated May 20, 2014, 11 pages.
International Bureau of WIPO; International Preliminary Report on Patentability for PCT App. No. PCT/US2012/049067, dated Feb. 13, 2014; 8 pages.
Korean Intellectual Property Office; International Search Report and Written Opinion for PCT App. No. PCT/US2012/049067, dated Feb. 27, 2013; 10 pages.
Hakola et al., "Device-to-Device (D2D) Communication in Cellular Network—Performance Analysis of Optimum and Practical Communication Mode Selection", Wireless Communications and Networking Conference (WCNC) 2010 IEEE, Apr. 2010.
Qualcomm News and Events—Press Releases; "Qualcomm to Demonstrate New Peer-to-Peer Technology at Mobile World Congress", Mobile World Congress 2011, printed Jun. 28, 2012, 2 pages.
3GPP, "Medium Access Control (MAC) Protocol Specification," 3rd Generation Partnership Project, Technical Specification Group Radio Access Network; Evolved Universal Terrestrial Radio Access (E-UTRA) (Release 10), 3GPP TS 36.321 V10.0.0, Dec. 2012, LTE Advanced, 53 pages.
3GPP, "Packet Data Convergence Protocol (PDCP) Specification"; 3rd Generation Partnership Project; Technical Specification Group Radio Access Network; Evolved Universal Terrestrial Radio Access (E-UTRA) (Release 10); 3GPP TS 36.323 V10.0.0, Dec. 2012, LTE Advanced; 24 pages.
3GPP; "Radio Link Control (RLC) Protocol Specification"; 3rd Generation Partnership Project; Technical Specification Group Radio Access Network; Evolved Universal Terrestrial Radio Access (E-UTRA) (Release 10); 3GPP TS 36.322 V10.0.0, Dec. 2012; LTE Advanced; 39 pages.
US Patent and Trademark Office; Office Action for U.S. Appl. No. 13/779,864 dated Jan. 28, 2014; 11 pages.
US Patent and Trademark Office; Notice of Allowance for U.S. Appl. No. 13/563,593 dated Sep. 3, 2014; 11 pages.
US Patent and Trademark Office; Office Action for U.S. Appl. No. 14/335,338 dated Feb. 20, 2015; 26 pages.

(56) References Cited

OTHER PUBLICATIONS

European Patent Office; Extended European Search Report for EP App. No. 12820557.2 dated Mar. 11, 2015; 6 pages.

German Patent Office; Examination Report for German App. No. 102012101863.4, dated Jun. 30, 2015; 15 pages, inclusive of English translation.

Chinese Patent Office; Third Office Action for Chinese App. No. 201210060928, dated Sep. 2, 2015; 13 pages. inclusive of English translation.

US Patent and Trademark Office; Office Action for U.S. Appl. No. 14/609,364 dated Sep. 30, 2015; 5 pages.

3GPP TS 36.331 V9.3.0 (Jun. 2010); 3rd Generation Partnership Project; Technical Specification Gruou Radio Access Network (E-UTRA); Radio Resource Control (RRC); Protocol specification (Release 9), pp. 1-250.

Article 94(3) issued Oct. 18, 2017 from European Patent Application No. 12820557.2, 4 pages.

First Office Action dated Nov. 24, 2017 from Chinese Divisional Application No. 201510251687.0, 8 pages.

Article 94(3) mailed May 2, 2018 from European Application No. 14702199.2, 5 pages.

COMMUNICATION DEVICES AND METHODS FOR NETWORK SIGNALING

CROSS REFERENCE TO RELATED APPLICATION

This application is a continuation of U.S. application Ser. No. 15/150,657, filed May 10, 2016, which is a continuation of U.S. application Ser. No. 13/043,606, filed Mar. 9, 2011, now U.S. Pat. No. 9,374,767 issued on Jun. 21, 2016, the content and disclosure of which are hereby incorporated by reference in their entireties.

TECHNICAL FIELD

Embodiments generally relate to communication devices and methods for network signaling.

BACKGROUND

In wireless communication networks, relay nodes (i.e. relay communication devices) may be used for various reasons such as expansion of coverage area, more efficient radio resource usage, or increase of communication quality. It is desirable that communication terminals are efficiently informed about the presence of such relay nodes.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Figure 1:
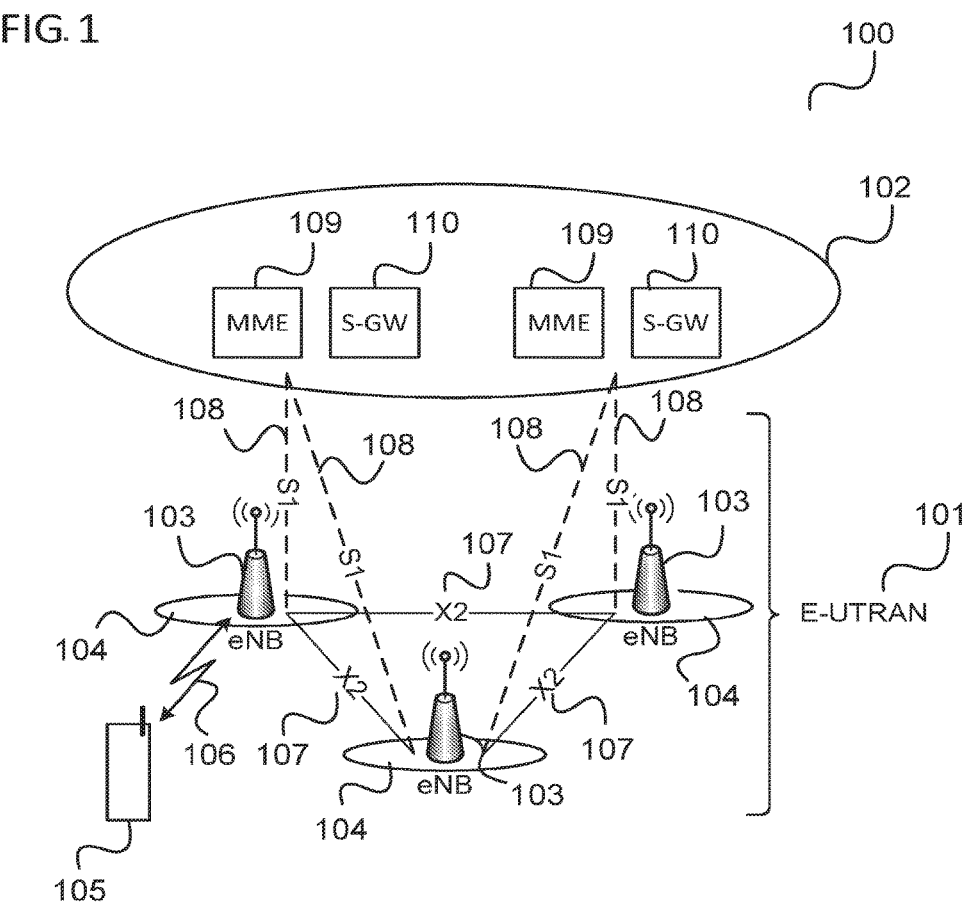
FIG. 1 shows a communication system according to an embodiment.

FIG. 1 shows a communication system 100 according to an embodiment.

According to this embodiment, the communication system 100 is configured in accordance with the network architecture of LTE. The communication system 100 may also be configured according to another communication standard, e.g. according to UMTS (Universal Mobile Telecommunications System), GSM (Global System for Mobile Communications), CDMA2000 (CDMA: Code Division Multiple Access), or FOMA (Freedom of Mobile Access).

The communication system 100 includes a radio access network (in this example, according to LTE an E-UTRAN, Evolved UMTS Terrestrial Radio Access Network) 101 and a core network (in this example, according to LTE an EPC. Evolved Packet Core) 102. The E-UTRAN 101 may include base (transceiver) stations (in this example, according to LTE eNodeBs, eNBs) 103. Each base station 103 provides radio coverage for one or more mobile radio cells 104 of the E-UTRAN 101.

A mobile terminal (in this example, according to LTE a UE, user equipment) 105 located in a mobile radio cell 104 may communicate with the core network 102 and with other mobile terminals 105 via the base station providing coverage (in other words operating) in the mobile radio cell.

Control and user data are transmitted between a base station 103 and a mobile terminal located in the mobile radio cell 104 operated by the base station 103 over the air interface 106 on the basis of a multiple access method.

The base stations 103 are interconnected with each other by means of the X2 interface 107. The base stations are also connected by means of the Si interface 108 to the core network (Evolved Packet Core) 102, more specifically to an MME (Mobility Management Entity) 109 and a Serving Gateway (S-GW) 110. The MME 109 is responsible for controlling the mobility of UEs located in the coverage area of E-UTRAN, while the S-GW 110 is responsible for handling the transmission of user data between mobile terminals 105 and core network 102.

The mobile terminal 105 may support several radio access technologies (RATs). For example, the mobile terminal 105 may support various cellular radio access technologies, e.g. GSM, UMTS, LTE, to connect to various cellular communication networks using different radio access technologies analogously as described, for the example of a LTE communication network and a LTE radio access network (E-UTRAN) 101 above with reference to FIG. 1.

The mobile terminal 105 may also support short range radio access technologies, e.g. Bluetooth and WiFi (e.g. IEEE 802.11), e.g. for getting sporadically access to a short range communication network.

Typically, a cellular communication network provides almost perfect coverage and availability with seamless mobility and a wide variety of offered services on the one hand but typically has an expensive and limited licensed spectrum used for the air interface 106 on the other hand.

In contrast to this, short range radio access technologies such as Bluetooth and WLAN can be used in the unlicensed bands which are free of charge and offer usually more bandwidth and more throughput per user, e.g. the ISM (Industrial Scientific Medical) band. Typically, the coverage area of short range technologies is small (e.g. the range is below 100 m) and mobility between different access points is often not offered, because most of them are not operated by the same operator but by different private individuals.

Thus, both radio access technologies (cellular and short range) have advantages and disadvantages. According to one embodiment, a concept to combine the two main advantages of both radio access technologies is used, namely to offer cellular communication services (i.e. communication services provided via a cellular mobile communication system) via license free spectrum. For this, a so-called opportunistic network (ON) is used. This is illustrated in FIG. 2.

Figure 2:
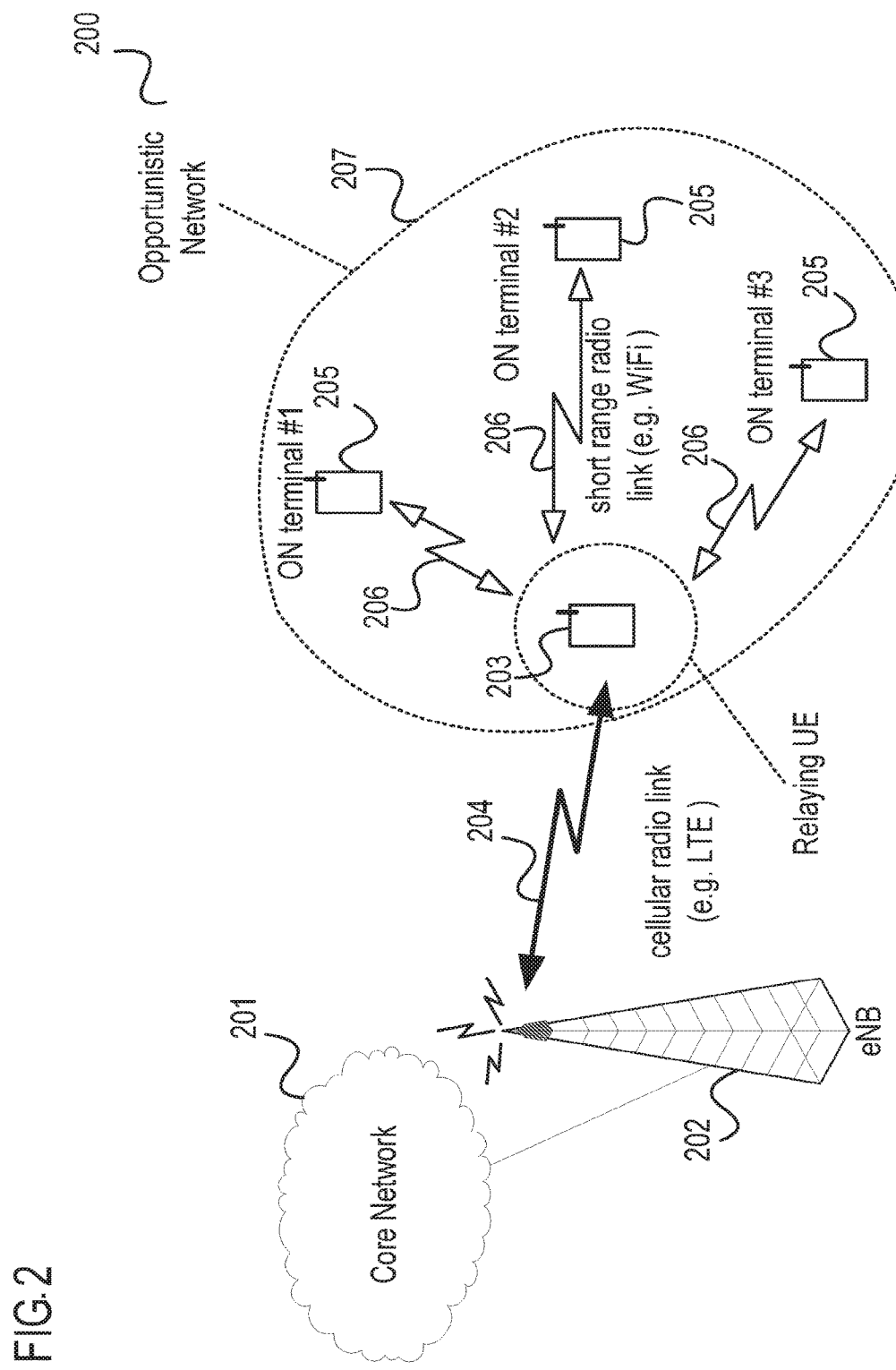
FIG. 2 shows a communication system according to an embodiment.

FIG. 2 shows a communication system 200 according to an embodiment.

The communication system 200 includes a core network 201 for example corresponding to the core network 102 shown in FIG. 1 and a base station 202 for example corresponding to one of the base stations 103 shown in FIG. 1.

The communication system 200 further includes a first mobile terminal 203 (e.g. corresponding to mobile terminal 105 of FIG. 1) which has a first radio link 204, for example according to LTE, e.g. via the air interface 106 of the communication system 100 of FIG. 1, to the base station 202.

The communication system 200 further includes one or more second mobile terminals 205. The second mobile terminals are connected to the first mobile terminal 203 via respective short range RAT second radio links 206. The first mobile terminal 203 works as a relaying mobile terminal. The first mobile terminal 203 is connected with the cellular network via cellular RAT by the first radio link 204. The first mobile terminal 203 forwards the data between the second mobile terminals 205 (also referred to as opportunistic network terminals) and the base station 202 (i.e. the cellular communication network of which the base station 202 is part). Thus, the second mobile terminals 205 can use the unlicensed short range RAT band to use communication services provided the cellular communication network. The first mobile terminal 203 and the second mobile terminals 205 may be seen to form an opportunistic network (ON) 207.

The opportunistic network concept may be desirable for the operator of the cellular communication network as the expensive resources from the licensed spectrum (used for cellular RAT radio links such as the first radio link 204) are used more efficiently. The users of the second mobile terminals 205 may benefit from accessing the communication services provided by the cellular communication network with larger data rates and lower costs by using them via the opportunistic network 207.

According to one embodiment, a mobile terminal is made aware of the availability of an opportunistic network, e.g. of the presence of a relaying mobile terminal such as the mobile terminal 203, such that it can operate as an opportunistic network terminal.

It should be noted that "WLAN Access Network Advertisement" is a method specified by 3GPP (3rd Generation Partnership Project). It may be used to indicate that a WLAN access network is present and that this WLAN access network offers access to a 3G core network. This information is broadcast by the WLAN access points of the WLAN or it is transmitted upon request of communication terminal. In both cases the WLAN itself transmits the relevant information. Thus, a communication terminal which has currently switched off its WLAN transceiver will not be informed about the presence of the WLAN access network and may therefore not benefit from using it.

Further, a base station (eNB) 103 according to LTE broadcasts so-called neighboring cell lists to the mobile terminals located in the radio cell 104 it operates. In these lists information are provided such as e.g. the radio cell ID and the used frequency bands of radio cells 104 neighboring the radio cell 104. This may be used by mobile terminal 105 to perform measurements of the relating radio cells 105 to ensure that it is always camped on the best radio cell 104 (in terms of signal quality). If this was used for advertising opportunistic networks all mobile terminals within the coverage area (or at least the same radio cell 104) would receive the same opportunistic network related information due to the broadcast technique. As the coverage areas an opportunistic network is typically very small related to the coverage area of a base station 103 (i.e. a radio cell 104), many mobile terminals would try to access to the opportunistic network even though they are not within the coverage area of the opportunistic network. This could lead at least to waste of battery power of the mobile terminals.

According to one embodiment, a network component of a cellular communication network, e.g. a base station, indicates the availability of an additional access network (such as an opportunistic networks) to one or more mobile terminals that will benefit from using the advertised access network. This may contain further data about the opportunistic networks to ease access to the network and to decide which opportunistic network to select. The advertisement may be mobile terminal specific and contain only data of opportunistic networks that are within mobile terminal's vicinity and which use radio technologies supported by the mobile terminal.

For example, a mobile terminal may be made aware of the availability of an additional access network (e.g. an opportunistic network) by dedicated signaling of an "ON advertisement" message from the base station operating the radio cell in which the access network and/or the mobile terminal is located to the mobile terminal.

Since mobile terminals operating as relaying mobile terminals (such as the first mobile terminal 203 in FIG. 2) may stop their operation as relaying mobile terminal (or generally as relaying communication device) or mobile terminals may start operation as relaying communication device, the network component, e.g. a base station, generally a communication device, may dynamically determine whether a communication device is operating as relay communication device, for example based on signals received from the communication device. This is illustrated in FIG. 3.

Figure 3:
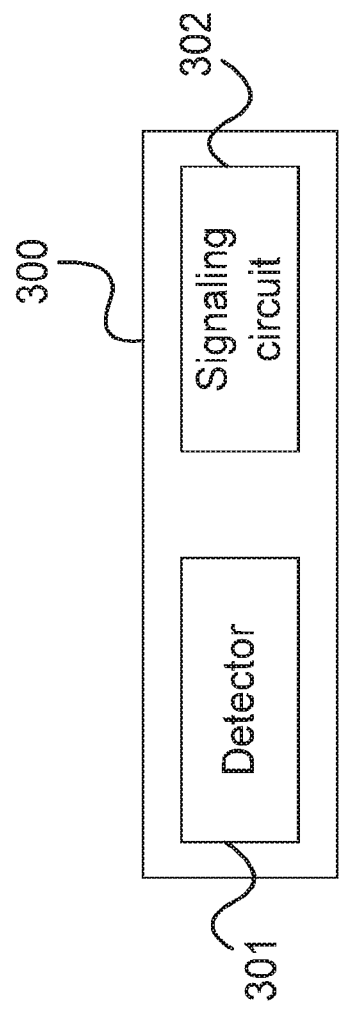
FIG. 3 shows a communication device according to an embodiment.

FIG. 3 shows a communication device 300 according to an embodiment.

The communication device 300 includes a detector 301 configured to detect, based on the reception of radio signals from another communication device, whether the other communication device is operating as a relay communication device in a radio cell associated with the communication device.

The communication device 300 further includes a signaling circuit 302 configured to signal to a communication terminal that the other communication device is operating as a relay communication device if it has been detected that the other communication device is operating as a relay communication device.

In other words, according to one embodiment, a communication device, e.g. being part of a cellular communication network, determines based on radio signals (or also the absence of radio signals) sent from a communication device, whether the communication device is operating as a relay communication device. The communication device may for example thus determine which relay communication devices are currently operating in a certain geographic area, in this case a radio cell associated with the communication device, such as a radio cell for which the communication device is responsible (e.g. in terms of control and/or operation). For example, the communication device may determine periodically (e.g. at predetermined times and/or once every predetermined time period) which relay communication devices (in other words which relay nodes) are present in the radio cell. The communication device may thus inform one or more communication terminals about the presence of relay communication terminals (for example of the presence of a relaying communication terminal of an opportunistic network and thus of the presence of the opportunistic network). For example, the communication device may inform one or more communication terminals about the presence of an opportunistic network. This is also referred to as an opportunistic network advertisement in the following.

The communication device 300 may further include a list generation circuit configured to generate a list of other communication devices operating as relay communication devices in the radio cell.

For example, the list generation circuit is configured to include the other communication device in the list if it has been detected that the other communication device is operating as a relay communication device.

The communication device may include an update circuit configured to update the list in response to the detection that one of the other communication devices of the list has quit operation as a relay communication device.

The update circuit is for example configured to update the list at predetermined points in time and/or to update the list periodically.

According to one embodiment, the detection whether the other communication device is operating as a relay communication device in the radio cell based on the reception of radio signals from the other communication device includes determining whether the other communication device has quit operation as relay communication device or has started operation as relay communication device.

According to one embodiment, the detection whether the other communication device is operating as a relay communication device in the radio cell based on the reception of radio signals from the other communication device includes determining whether an expected signal is received from the other communication device and deciding that the other communication device does not operate as relay communication device if the expected signal is not received from the other communication device.

According to one embodiment, the detection whether the other communication device is operating as a relay communication device in the radio cell based on the reception of radio signals from the other communication device includes detecting whether a message indicating that the other communication device has started operation has been received from the other communication device.

The communication device may further include a radio receiver configured to receive radio signals from a relay communication device.

According to one embodiment, the operation as a relay communication device is the operation as a relay communication device between the communication device and the communication terminal.

For example, the operation as a relay communication device is the operation as a relay communication device communicating with the communication device using a first radio technology and communicating with the communication terminal using a second radio technology.

The first radio technology is for example a wide area network radio technology and/or a cellular mobile communication network radio technology.

The second radio technology is for example a local area network radio technology and/or a short range radio technology, e.g. a WLAN radio technology or a Bluetooth radio technology.

The communication device is for example a component of a mobile communication network.

According to one embodiment, the communication device is a base station operating the radio cell.

The communication terminal may be a subscriber terminal of the mobile communication network.

The other communication device may be a communication terminal (e.g. a subscriber terminal of the mobile communication network).

According to one embodiment, the other communication device is a subscriber terminal of the mobile communication network.

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

Figure 4:
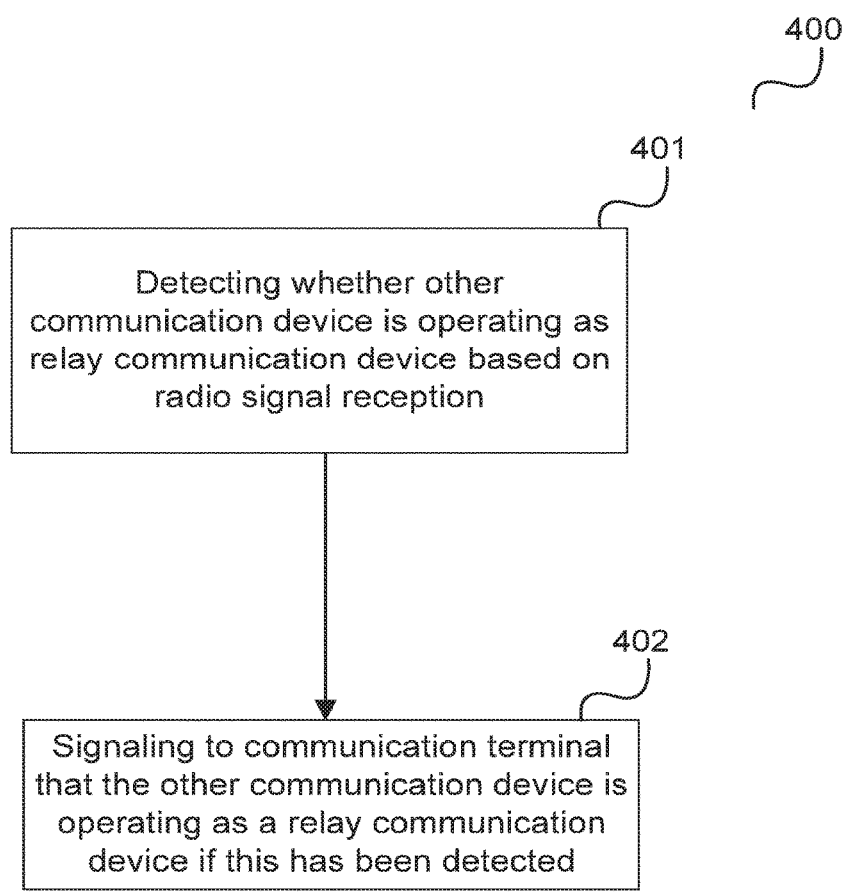
FIG. 4 shows a flow diagram according to an embodiment.

According to one embodiment, the communication device 300 carries out a method as illustrated in FIG. 4.

FIG. 4 shows a flow diagram 400 according to an embodiment.

The flow diagram 400 illustrates a method for network signaling.

In 401, it is detected, based on the reception of radio signals from another communication device, whether the other communication device is operating as a relay communication device in a radio cell associated with the communication device.

In 402, it is signaled to a communication terminal that the other communication device is operating as a relay communication device if it has been detected that the other communication device is operating as a relay communication device.

Figure 5:
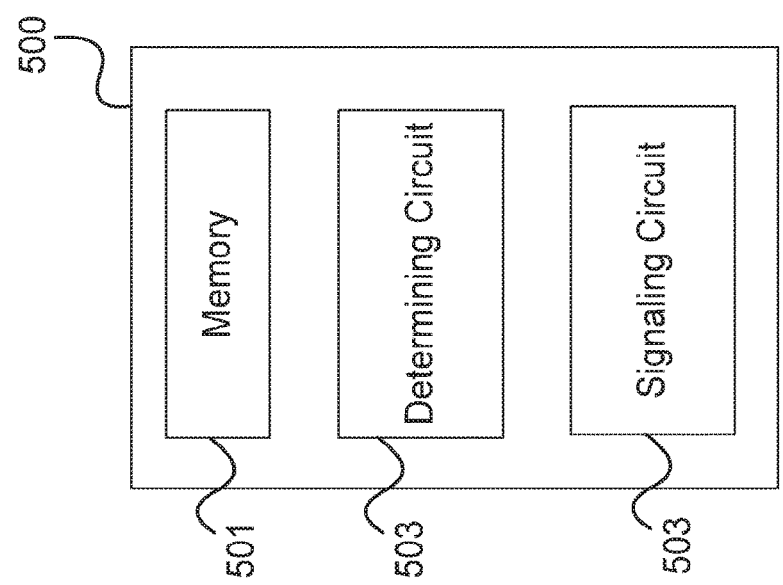
FIG. 5 shows a communication device according to an embodiment.

FIG. 5 shows a communication device 500 according to an embodiment.

The communication device 500 includes a memory 501 storing a list of communication devices operating as relay communication devices in a radio cell associated with the communication device and a determining circuit 502 configured to determine, for a communication terminal, those one or more communication devices from the list of communication devices that can be used as relay communication devices by the communication terminal based on information about the communication terminal.

The communication device 500 further includes a signaling 503 circuit configured to signal information about the determined one or more communication devices to the communication terminal.

According to one embodiment, in other words, a communication device, e.g. a component of a cellular mobile communication network such as a base station informs a communication terminal about the presence of relay communication devices that can actually be used by the communication terminal by filtering a list of relay communication devices stored in the communication device based on information about the communication terminal, e.g. based on properties of the communication terminal, for example in accordance with the capabilities or the location of the communication terminal.

According to one embodiment, the determining circuit is configured to determine those one or more communication devices from the list of communication devices that can be used as relay communication devices by the communication terminal based on information about radio capabilities of the communication terminal.

For, example, the communication device includes a receiver configured to receive the information, for example from the communication terminal.

Figure 6:
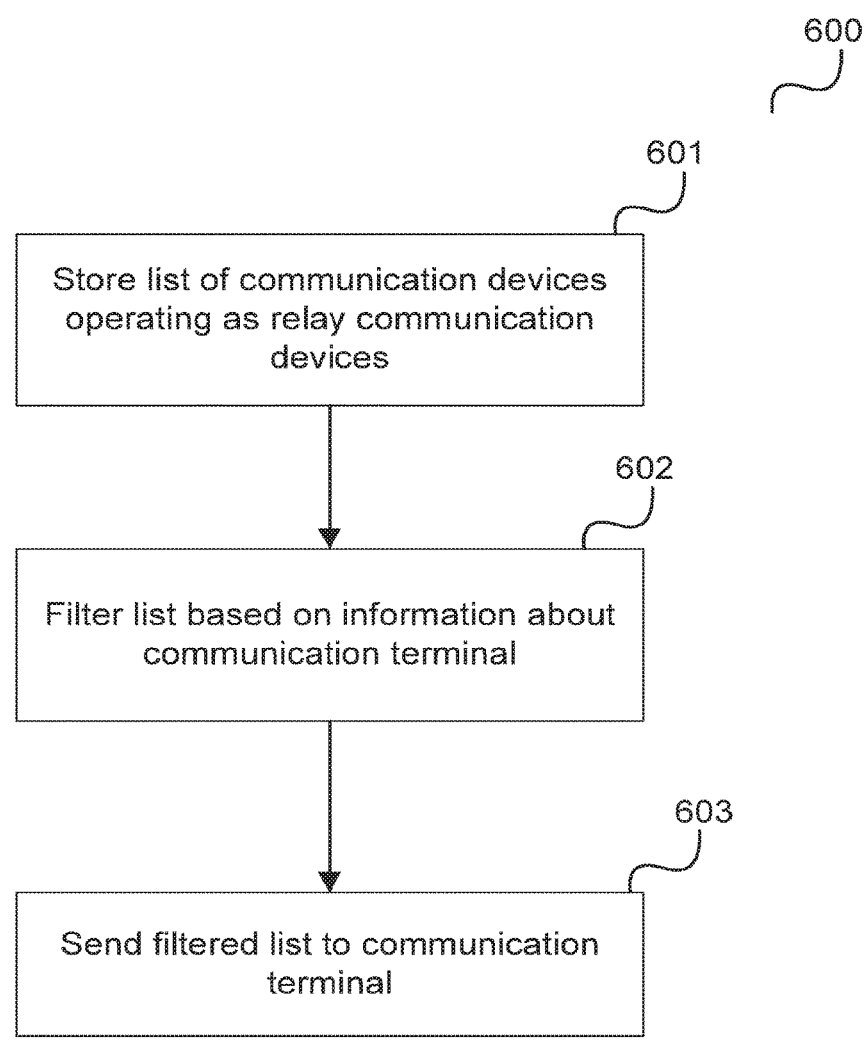
FIG. 6 shows a flow diagram according to an embodiment.

The communication device 500 for example carries out a method as illustrated in FIG. 6.

FIG. 6 shows a flow diagram 600 according to an embodiment.

The flow diagram 600 illustrates a method for network signaling.

In 601, a list of communication devices operating as relay communication devices in a radio cell associated with the communication device is stored.

In 602, it is determined, for a communication terminal, those one or more communication devices from the list of communication devices that can be used as relay communication devices by the communication terminal based on information about the communication terminal.

In 603, information about the determined one or more communication devices is signaled to the communication terminal.

It should be noted that embodiments described in context with one of the communication devices are analogously valid for the other communication device and the methods for network signaling where applicable and vice versa.

For example, the communication device 300 and/or the communication device 400 corresponds to the base station 202 of the communication system 200 shown in FIG. 2 and the mobile communication terminal to be informed about the presence of relay communication devices, e.g. the presence of the first mobile terminal 203 and thus the presence of an opportunistic network, corresponds to one of the second mobile terminals 205.

According to one embodiment, the transmission of the signaling about the presence of the first mobile terminal 203 is triggered during normal operation of the second mobile terminal 205 in the communication system 200, e.g.

when the second mobile terminal 205 with no ongoing connections (i.e. in idle mode) is entering the radio cell operated by the base station 202 and transmits a tracking area update message to the base station 202. This method is advantageous as no delay at connection setup to the opportunistic network is added when the second mobile terminal 205 wants to establish a connection.

when the second mobile terminal 205 with no ongoing connections (i.e. in idle mode) wants to establish a connection and transmits a connection request message to the base station 202. In this case an opportunistic network advertisement message is send for example after reception of the connection request message. This commands the second mobile terminal 205 to establish the connection towards the opportunistic network. With this approach a handover is not required and signaling overhead may thus be reduced.

after the connection towards the base station 202 is established by the second mobile terminal 205. The second mobile terminal 205 performs a handover to the opportunistic network after reception of this message. With this approach, no delay at connection setup is added.

when an opportunistic network is newly established or the properties of an opportunistic network have changed and the base station 202 was made aware of this new or changed opportunistic network. Thus, the second mobile terminal 205 may select a better suitable opportunistic network if it is available.

According to one embodiment, an opportunistic network advertisement message sent for informing the second mobile terminal 205 about relay communication device presence contains following data to ease access to the communication network and to decide which opportunistic network to select:

ON type (e.g. "IEEE 802.11n", "Bluetooth", . . . )
ON-ID
ON name (human readable, e.g. the SSID in case of IEEE 802.11)
frequency band used by the opportunistic network
Information related to the currently offered Quality of Service (QoS), i.e. an indication of the offered communication class (e.g. VoIP, media streaming, etc.)
password needed for accessing the opportunistic network
indication of current load (e.g. number of connected mobile terminals, average un-occupied resources, available QoS etc.)
assistance data for: encryption methods and/or verification of digital signatures
location/position of the relaying first mobile terminal 203

According to one embodiment, the base station 202 stores and maintains a list with opportunistic networks that are currently operated by this base station 202 (e.g. by serving a mobile terminal operating as a relay communication device). For each opportunistic network the data needed for the ON advertisement message are stored in a separate data set. A new data set is added to the list, when a new opportunistic network is operated by this base station 202. An entry is deleted, if the relaying mobile terminal 203 leaves the cell or stops operation as relay communication device. Part of the stored parameters are updated periodically by the opportunistic network (e.g. parameters related to the current resource occupation) or upon change (e.g. if the access parameters have changed), while other components in the opportunistic network data set remain static, such as the ON-ID.

The ON advertisement message may be generated individually for each second mobile terminal 205 by the base station 202. For example, only opportunistic networks that are in the vicinity of a second mobile terminal 205 and that supports a short range technology used by the second mobile terminal 205 are included in the ON advertisement message for the second mobile terminal 205. This saves resources used for signaling and prevents second mobile terminal 205s from access attempts to an opportunistic network that is currently not accessible.

By using the advertising procedure according to an embodiment, a second mobile terminal 205 can use the idle mode procedures from the cellular communication system while it is in idle mode and can use the opportunistic network while in connected mode. Thus, the second mobile terminal 205 may benefit in idle mode from lowest power consumption and permanent availability due to the very good cellular coverage and may benefit in connected mode from larger data rates, cheaper costs and lower power consumption when an opportunistic network is available.

According to embodiments, the second mobile terminal 205 does not need to permanently scan for opportunistic network availability. Nevertheless the second mobile terminal 205 could use an opportunistic network anytime when it is available.

In the following, examples for opportunistic network advertisement at connection setup are described with reference to FIG. 7.

Figure 7:
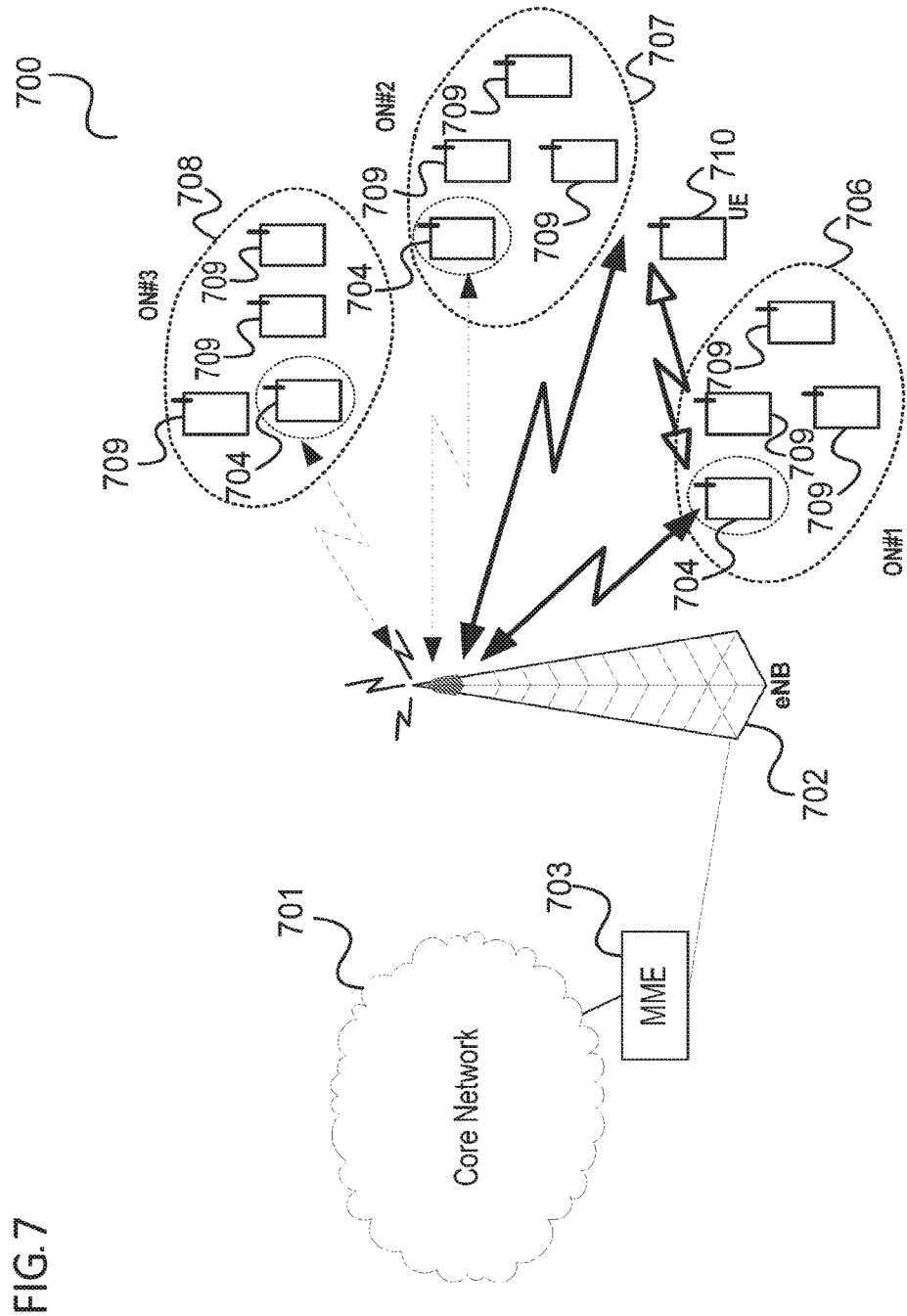
FIG. 7 shows a communication system according to an embodiment.

FIG. 7 shows a communication system 700 according to an embodiment.

The communication system 700 includes a core network 701 for example corresponding to the core network 102 shown in FIG. 1 and a base station 702 for example corresponding to one of the base stations 103 shown in FIG. 1 connected to the core network 701 via an MME 703 for example corresponding to the MME 109 shown in FIG. 1.

The communication system 700 further includes first mobile terminals 704 (e.g. corresponding to mobile terminal 105 of FIG. 1) having first radio links 705, e.g. via the air interface 106 of the communication system 100 of FIG. 1, to the base station 702. The first mobile terminals 704 operate as relay communication devices for a first opportunistic network 706, a second opportunistic network 707, and a third opportunistic network 708 analogously as described above with reference to FIG. 2.

The opportunistic networks 706, 707, 708 include second mobile terminals 709.

The communication system 700 further includes a third mobile terminal 710 which is in this example the mobile terminal to be informed about opportunistic network presence.

The communication system 700 is for example a cellular communication system compliant to 3GPP's Release 8 communication standard. The second mobile terminals 709 are for example equipped with a short range transmission module according to IEEE 802.1 in for communicating with the respective relaying mobile terminal 704.

According to one embodiment, an opportunistic network advertisement is carried out at connection setup. A corresponding message flow is illustrated in FIG. 8.

Figure 8:
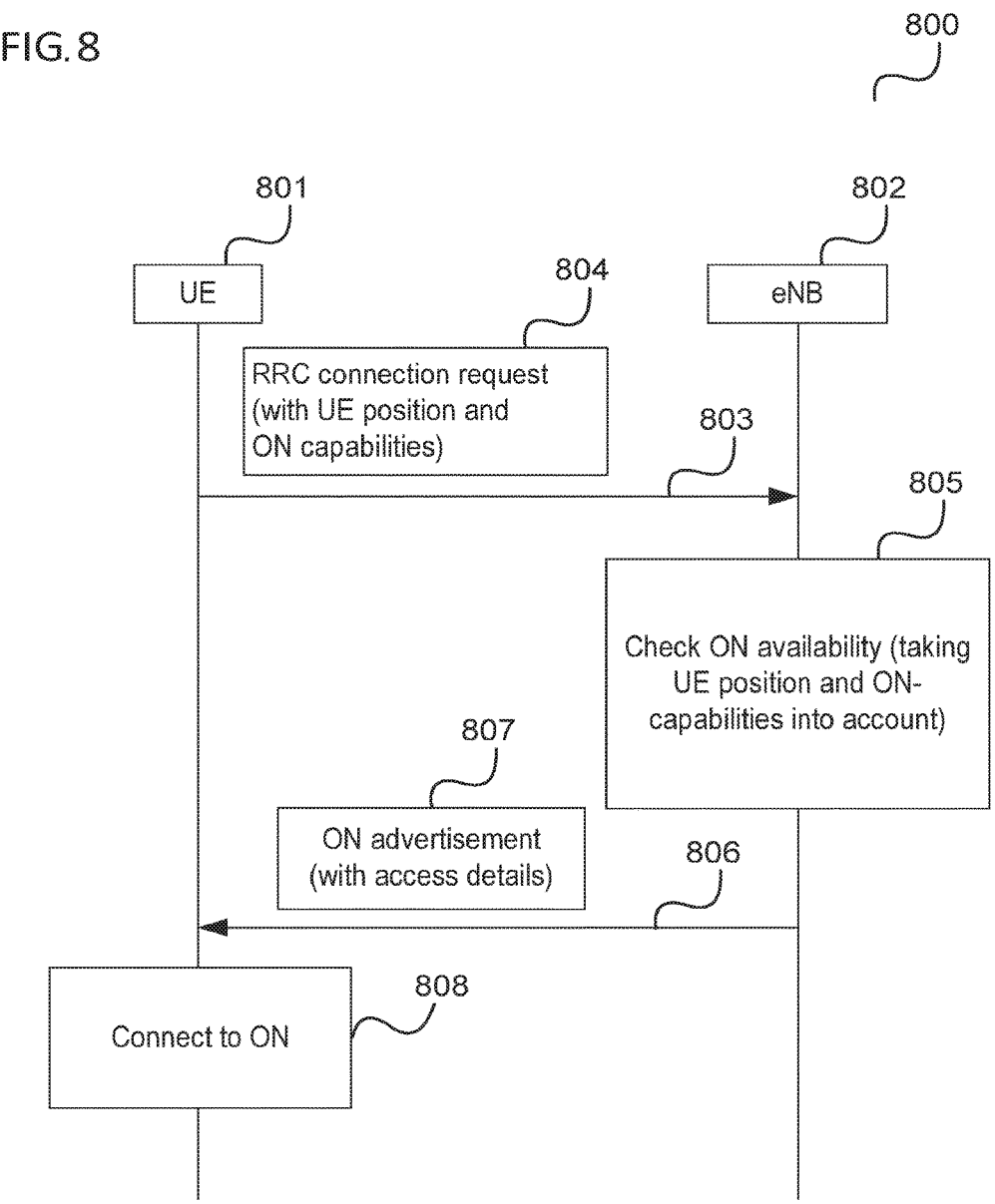
FIG. 8 shows a message flow diagram according to an embodiment.

FIG. 8 shows a message flow diagram 800 according to an embodiment.

The message flow diagram 800 takes place between a mobile terminal 801 corresponding to the third mobile terminal 710 and a base station 802 corresponding to the base station 702.

It is assumed that the mobile terminal 801 in FIG. 2 is in idle mode and wants to establish a connection to the core network (e.g. for Internet browsing) 701. Therefore, in 803 it transmits a message 804 to the base station 802 which is an RRC connection request message including two additional parameters, namely i) the current position of mobile terminal 801 (position, speed and moving direction), ii) the ON-capabilities of mobile terminal 801 (i.e. a list of short range technologies that are supported including further details (e.g. supported version and maximum data rate)). The mobile terminal 801 is not aware of the presence of an opportunistic network at this point in time.

In 805, upon reception of the message 804 the base station 802 checks whether at least one opportunistic network is currently operated within its coverage area. For this, the base station 802 stores an ON list, i.e. for each currently operated opportunistic network the access details (opportunistic network type, opportunistic network name, frequency band, . . . ) and the position of the relaying mobile terminal for the opportunistic network. In this example, according to the assumed scenario illustrated in FIG. 7 the check is positive since the three opportunistic networks 706, 707, 708 are assumed to be currently operated within the coverage area of the base station 802. To provide a more precise advertisement, the base station 802 only advertises opportunistic networks which are or will be within mobile terminal 801's vicinity and which are using a short range technology that is supported by the mobile terminal 801. Therefore the base station 802 uses the current position, speed and moving direction of the mobile terminal 801 and the opportunistic network capabilities received in 803. In this example the base station 802 selects the first opportunistic network 706 and the second opportunistic network 707 since they are in this example close to the mobile terminal 801 and in this example use a short range technology supported by the mobile terminal 801. Therefore the base station 802 decides to advertise the selected opportunistic networks to the mobile terminal 801.

Accordingly, in 806 it sends an ON advertisement message 807 to the mobile terminal 801 with the information about how to access the selected opportunistic networks and about the current load of the opportunistic networks.

In 808, upon reception of the ON advertisement message the advertisement procedure ends. The mobile terminal 801 may try to connect to one of the opportunistic networks indicated in the received message. It may use the information included in the ON advertisement message 807 about the current load to select an opportunistic network, e.g. it may select the opportunistic network that offers more unoccupied resources. In another example it may use the indication of the communication class to select an appropriate opportunistic network.

The procedure illustrated in FIG. 8 may be well suited for non-time-critical connection setups. It can be implemented with little signaling and thus saves resources of the cellular communication network.

According to one embodiment, an opportunistic network advertisement is carried out after connection setup with the base station 702. A corresponding message flow is illustrated in FIG. 9.

Figure 9:
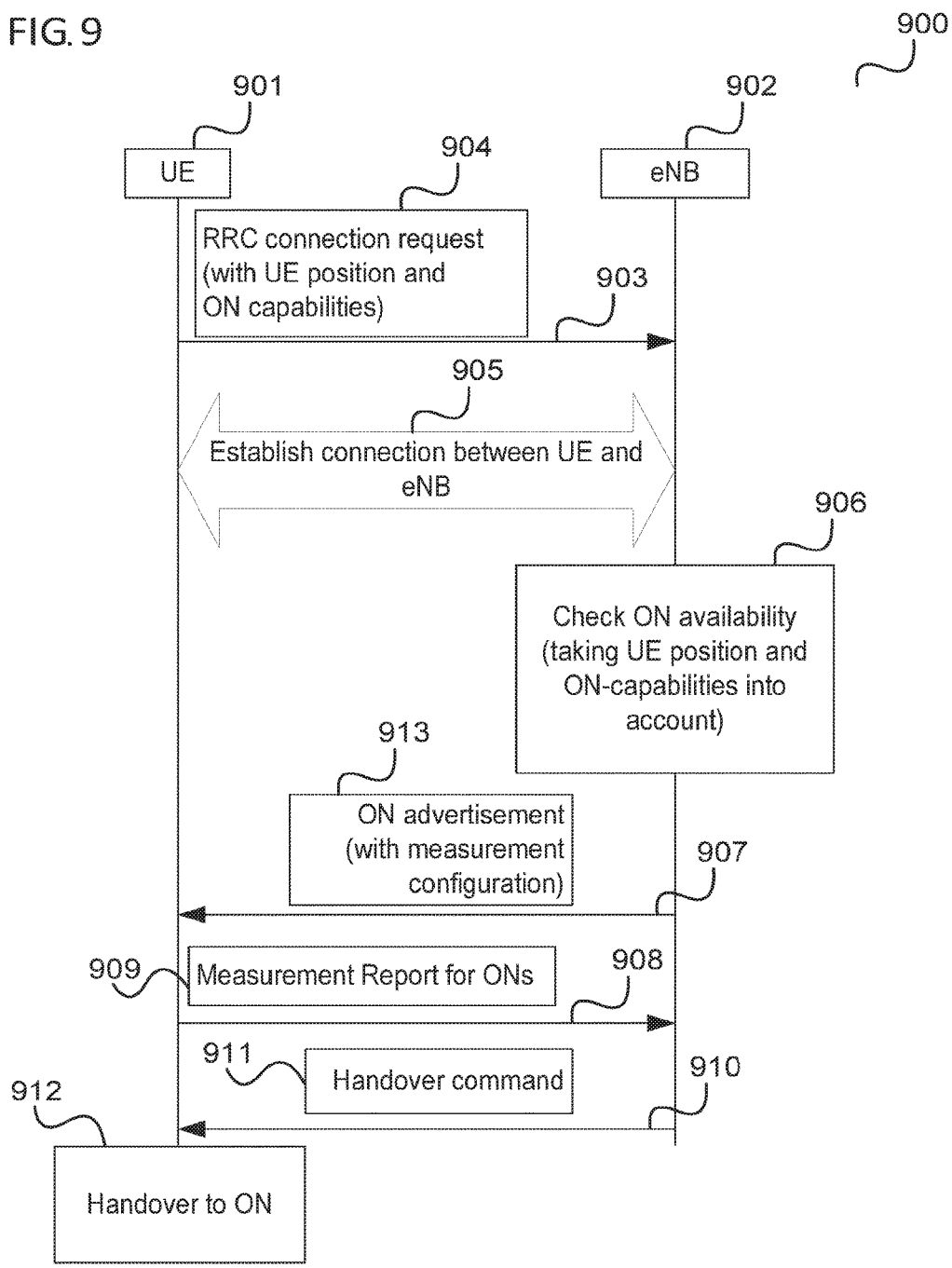
FIG. 9 shows a message flow diagram according to an embodiment.

FIG. 9 shows a message flow diagram 900 according to an embodiment.

The message flow diagram 900 takes place between a mobile terminal 901 corresponding to the third mobile terminal 710 and a base station 902 corresponding to the base station 702.

It is assumed that the mobile terminal 901 initially is in idle mode and wants to establish a connection to the core network (e.g. for internet browsing) 701.

Therefore, in 903 it transmits a message to the base station 902 which is a RRC connection request message including two additional parameters, namely i) the current position of the mobile terminal 901 (position, speed and moving direction) and ii) the opportunistic network capabilities of the mobile terminal 901 (i.e. a list of short range technologies that are supported including further details (e.g. supported version and maximum data rate)). It is assumed that the mobile terminal 901 is not aware of the presence of an opportunistic network at this point in time.

In 905, the base station 902 establishes a communication connection towards the mobile terminal 901 (e.g. as usual).

In 906, after establishment of the connection, the base station 902 checks whether at least one opportunistic network is currently operated within its coverage area. For this, the base station 902 stores an ON list, i.e. for each currently operated opportunistic network the access details (opportunistic network type, opportunistic network name, frequency band, . . . ) and the position of the respective relaying mobile terminal 704. According to the scenario assumed in this example as illustrated in FIG. 7, the check is positive since the three opportunistic networks 706, 707, 708 are assumed to be currently operated. To provide a more precise advertisement, the base station 902 only advertises opportunistic networks which are or will be within mobile terminal 901's vicinity and which are using a short range technology that is supported by the mobile terminal 901. For this, the base station 902 uses the current position, speed and moving direction of the mobile terminal 901 and the opportunistic network capabilities received in 903. In this example the base station 902 selects the first opportunistic network 706 and the second opportunistic network 707 since they are close to the mobile terminal 901 and use a supported short range technology. Therefore the base station 902 decides to advertise the opportunistic networks to the mobile terminal 901.

In 907, the base station 902 sends an ON advertisement message 913 to the mobile terminal 901 with the information about the selected opportunistic networks (opportunistic network type, opportunistic network name, used frequency band) and about measurements of the opportunistic networks (e.g. periodicity of measurements and when to report measurements).

Upon reception of the ON advertisement message the mobile terminal 901 starts to perform measurements of the advertised opportunistic networks and reports the measurement results in 908 as a measurement report 909 to the base station 902.

If the measurements results fulfill one or more certain criteria, e.g. the measured signal quality is above a certain level, the base station 902 decides to hand over the connection to the opportunistic network 706, 707, 708 fulfilling the one or more criteria. Further criteria may be taken into account, e.g. the current load of the opportunistic network 706, 707, 708. It is assumed that all criteria for a handover are fulfilled. Accordingly, in 910, the base station 902 transmits a handover command message 911 to the mobile terminal 901. The handover command message 911 for example includes access details of the selected opportunistic network, in this example the first opportunistic network 706.

In 912, the mobile terminal 901 connects to the opportunistic network indicated in the received message.

The procedure illustrated in FIG. 9 may be well suited for time-critical connection setups, as there is no additional delay during the connection setup.

It should be noted that in the embodiments described above with reference to FIGS. 8 and 9 it is assumed that the mobile terminal 801, 901 is originating the connection setup. Nevertheless, the approaches according to these embodiments are also analogously applicable in case the communication network originates the connection setup, e.g. in case that incoming data for the mobile terminal 801, 901 arrives at the core network 701. In this case a paging message is received by the mobile terminal 801, 901 prior to the transmission of the RRC connection request message. After that the procedure can be carried out as described above with reference to FIGS. 8 and 9, respectively.

In the following, an embodiment is described in which an ON advertisement for a mobile terminal is carried out in idle mode of the mobile terminal with reference to FIG. 10.

Figure 10:
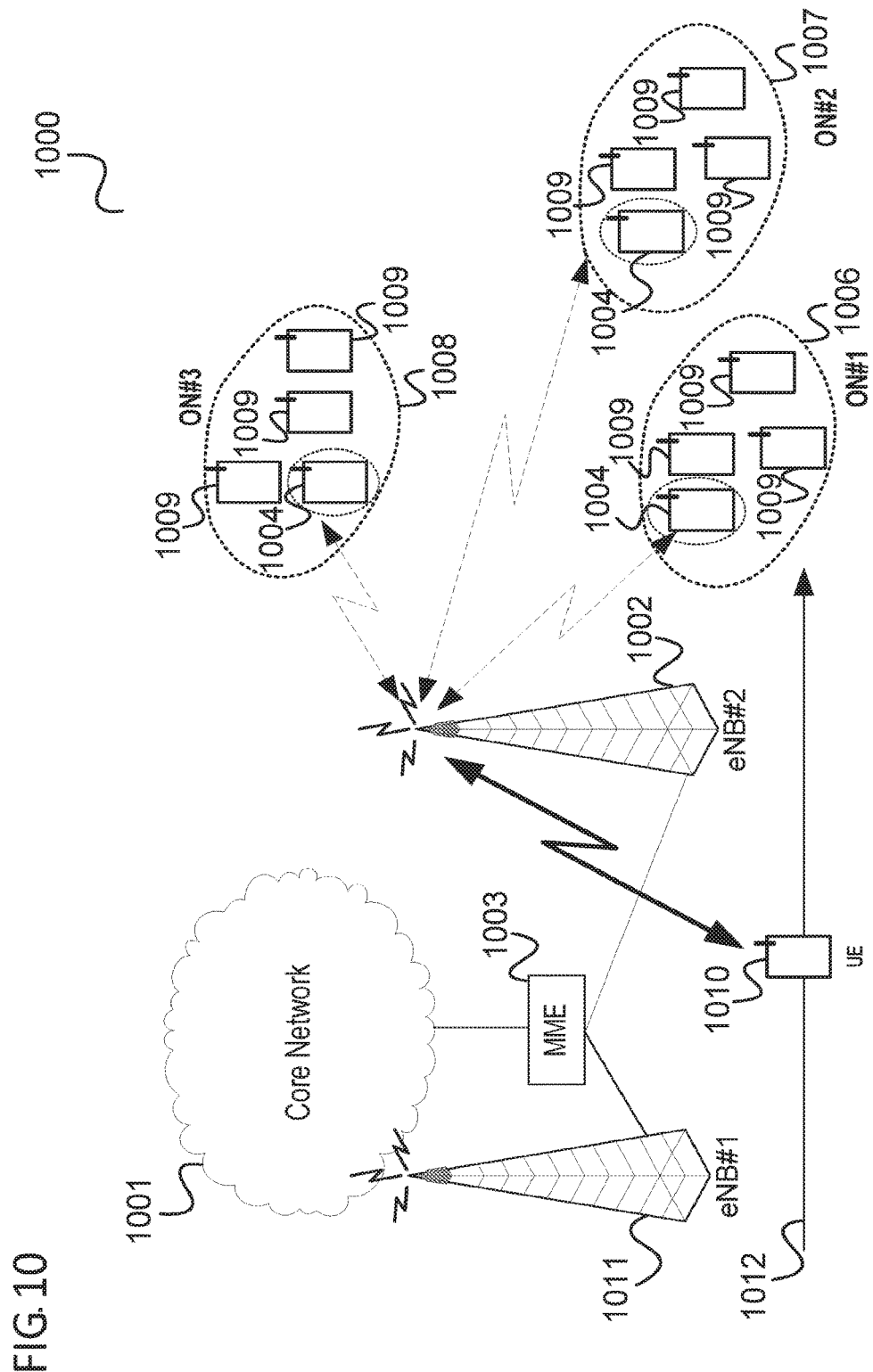
FIG. 10 shows a communication system according to an embodiment.

FIG. 10 shows a communication system 1000 according to an embodiment.

The communication system 1000 includes a core network 1001 for example corresponding to the core network 102 shown in FIG. 1, a first base station 1011 and a second base station 1002 for example corresponding to two of the base stations 103 shown in FIG. 1 connected to the core network 1001 via an MME 1003 for example corresponding to the MME 109 shown in FIG. 1.

The communication system 1000 further includes first mobile terminals 1004 (e.g. corresponding to mobile terminal 105 of FIG. 1) having first radio links 1005, e.g. via the air interface 106 of the communication system 100 of FIG. 1, to the second base station 1002. The first mobile terminals 1004 operate as relay communication devices for a first opportunistic network 1006, a second opportunistic network 1007, and a third opportunistic network 1008 analogously as described above with reference to FIG. 2.

The opportunistic networks 1006, 1007, 1008 include second mobile terminals 1009.

The communication system 1000 further includes a third mobile terminal 1010 which is in this example the mobile terminal to be informed about opportunistic network presence.

The communication system 1000 is for example a cellular communication system compliant to 3GPP's Rel. 8. The second mobile terminals 1009 are for example equipped with a short range transmission module according to IEEE 802.11n for communicating with the respective relaying mobile terminal 1004.

Figure 11:
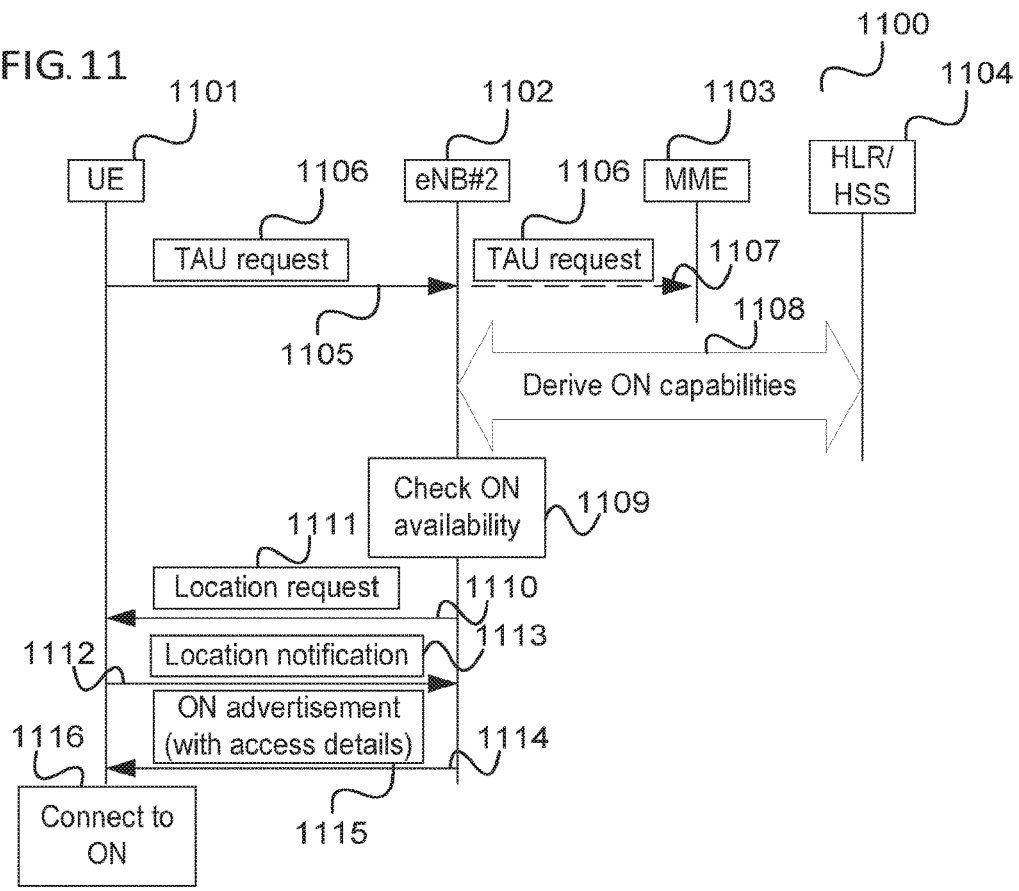
FIG. 11 shows a message flow diagram according to an embodiment.

A message flow according to one embodiment is illustrated in FIG. 11.

FIG. 11 shows a message flow diagram 1100 according to an embodiment.

The message flow diagram 1100 takes place between a mobile terminal 1101 corresponding to the third mobile terminal 1010, a base station 1102 corresponding to the second base station 1002, an MME 1103 corresponding to MME 1003, and a HLR (Home Location Register) or a HSS (Home Subscriber Server) for example located in the core network 1001.

It is assumed that the mobile terminal 1101 is in idle mode and enters coverage area of the base station 1102 (e.g. leaving the coverage area of the first base station 1011 as indicated by arrow 1012 in FIG. 10). It is assumed that the base station 1102 is currently operating the three opportunistic networks 1006, 1007, and 1008.

The mobile terminal 1101 performs a tracking area update because the tracking area has changed and transmits, in 1105 a corresponding tracking area update (TAU) request message 1106 to the base station 1102.

The base station 1102 handles the tracking area update request message 1106 as usual by forwarding it to the relevant MME 1103 in 1107. In addition, in 1108, it derives the opportunistic network capabilities of the mobile terminal 1101 by asking the HLR/HSS 1104. For this, the HLR/HSS stores the opportunistic network capabilities for each mobile terminal 1101 (i.e. a list of short range technologies that are supported including further details (e.g. supported version and maximum data rate)). In this example the mobile terminal 1101 supports IEEE 802.11n.

In 1109 the base station 1102 checks whether at least one opportunistic network that uses a short range technology supported by the mobile terminal 1101 is currently operated within its coverage area. For this, the base station 1102 stores an opportunistic network list, i.e. for each currently operated opportunistic network the access details (opportunistic network type, opportunistic network name, frequency band . . . ) and the position of the respective relaying mobile terminal 1104. According to the scenario illustrated in FIG. 10 the check is positive since the three opportunistic networks 1006, 1007, 1008 are assumed to currently operate and to use IEEE 802.11n. Therefore the base station 1102 decides to advertise the opportunistic networks to the mobile terminal 1101. To provide a more precise advertisement, the base station 1102 only advertises opportunistic networks which are or will be within the vicinity of the mobile terminal 1101. For this, in 1110, the base station 1102 transmits of a location request message to the mobile terminal 1101, for deriving the current position, speed and moving direction of the mobile terminal 1101.

In 1112, the mobile terminal 1101 answers the location request 1111 by transmission of its position, speed and moving direction with a location notification message 1113 to the base station 1102. It derives this data by using for example GPS (Global Positioning System) or cellular-based positioning methods.

Based on the received location information the base station 1102 selects the opportunistic networks which are within mobile terminal 1101s vicinity or which can be expected to be within the vicinity of the mobile terminal 1101 based its current moving direction. In this example, the base station 1102 selects the first opportunistic network 1006 and the second opportunistic network 1007. In 1114, the base station 1102 sends the access details of the selected opportunistic networks (at least one of the following parameters: opportunistic network type (e.g. IEEE 802.11n), opportunistic network name, frequency band, password needed for access, indication of current load (e.g. number of connected mobile terminal 1101s, average un-occupied resources, available QoS . . . )) to the mobile terminal 1101 with a ON advertisement message 1115.

Upon reception of the ON advertisement message 1115 by the mobile terminal 1101 the advertisement procedure ends. In 1116, the mobile terminal 1101 has two options: it may immediately try to connect to one of the opportunistic networks indicated in the received ON advertisement message 1115 or it may store the access details and try to connect to one of the opportunistic networks in case a connection to the core network 1001 is needed. The mobile terminal's 1101 decision about which opportunistic network to connect may depend on the access details received.

The approach described with reference to FIG. 11 may be well suited in case the mobile terminal 1101 is not changing its distance towards the advertised opportunistic networks for a while, e.g. in case both the mobile terminal 1101 and the opportunistic network (i.e. at least the respective relaying mobile terminal 1004) are located in the same bus or train.

In the following an embodiment is described with reference to FIG. 12 in which an opportunistic network advertisement is carried out after change of an opportunistic network list.

Figure 12:
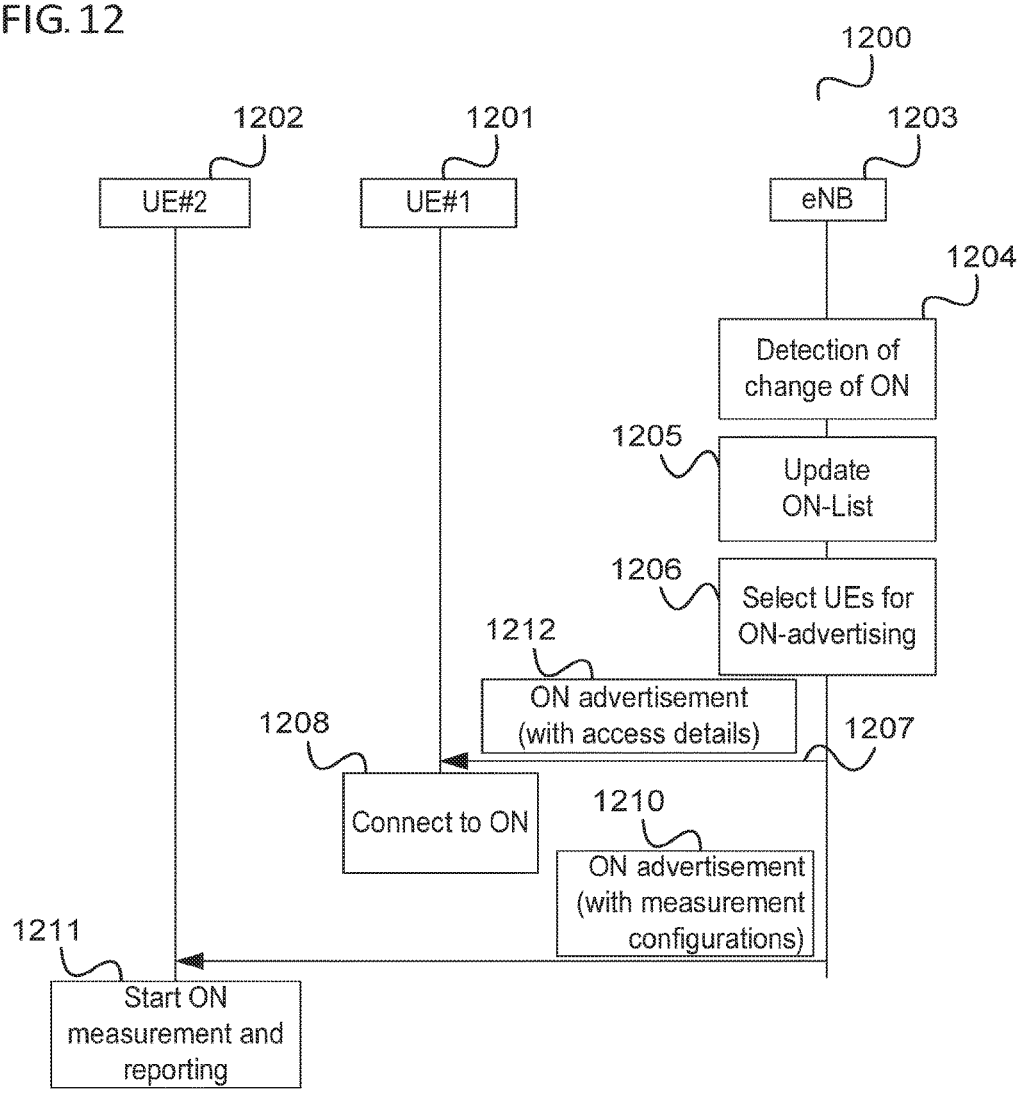
FIG. 12 shows a message flow diagram according to an embodiment.

FIG. 12 shows a message flow diagram 1200 according to an embodiment.

The message flow takes place between a first mobile terminal 1201, a second mobile terminal 1202, and a base station 1203.

In 1204, the base station 1102 detects a change of the operated opportunistic networks. This may be:

An opportunistic network stops operation (e.g. because the respective relaying mobile terminal is no more willing or able to offer the connection to the cellular mobile communication network for the mobile terminals using the opportunistic network, is no more willing or able to operate as relay node for the base station 1102 or because the relaying mobile terminal has left the radio cell operated by the base station).

An opportunistic network starts operation.

A relaying mobile terminal reports changes of access properties (e.g. position, number of mobile terminals using the opportunistic network, amount of free resources, changed maximum bit rate of cellular radio link, . . . )

In 1205, the base station 1102 updates the entries in a list of opportunistic networks, e.g. of opportunistic networks available in the radio cell operated by the base station 1102.

In 1206, the base station 1102 selects one or more mobile terminals for which an opportunistic network advertisement should be transmitted and determines which type of opportunistic network advertisement should be transmitted (with access details or with measurement configuration). In case the base station 1102 wants to decide whether a mobile terminal should access a certain opportunistic network, it selects opportunistic network advertisement with measurement configuration. In case the base station 1102 wants that the mobile terminal decides on its own to access certain opportunistic network, it selects opportunistic network advertisement with access details. Only mobile terminals are selected which are or can be expected to be within the vicinity of the opportunistic network that has caused the update of 1205 and which are supporting a short range technology that is used by the opportunistic network that has caused the update of 1205. Further, not all changes are reported by the base station 1102. In this example only in case an opportunistic network starts operation opportunistic network advertisements are transmitted.

In the following it is assumed that an opportunistic network starts operation and that base station 1102 selects the first mobile terminal 1201 and the second mobile terminal 1202 as they are within the vicinity of the opportunistic network and support the short range technology of the opportunistic network.

The base station 1102 decides that the first mobile terminal 1201 should decide on its own when and if to connect to the opportunistic network. second mobile terminal 1202 should report measurement results of the opportunistic network so that the base station 1102 can decide when second mobile terminal 1202 should connect to the opportunistic network. Accordingly, the base station 1102 transmits in 1207 a first opportunistic network advertisement message 1212 with access details of the opportunistic network to the first mobile terminal 1201.

In 1208, the first mobile terminal 1201 connects to the opportunistic network.

Further, in 1209, the base station 1102 transmits a second ON advertisement message 1210 with measurement configuration for the opportunistic network to the second mobile terminal 1202.

In 1211, the second mobile terminal 1202 starts to measure the opportunistic network and reports the results to the base station 1102 as indicated in the received second ON advertisement message 1210. It is up to the base station 1102 to transmit a handover command if the measurement report fulfills certain criteria, e.g. the signal level of the opportunistic network is above a certain threshold.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. Circuitry to be implemented in a first user equipment (UE), the circuitry comprising:
   memory circuitry having instructions; and
   processor circuitry coupled with the memory circuitry, the processor circuitry to execute the instructions to:
      identify, based on information included in an obtained message, a second UE that is to act as a relay node, wherein the second UE that is to act as the relay node is to provide cellular network connectivity to the first UE through the second UE and a cellular radio link between the second UE and a base station; and
      control establishment of a short range radio link with the second UE to obtain the cellular network connectivity through the second UE.

2. The circuitry of claim 1, wherein the message is a first message, and the processor circuitry is to execute the instructions to:
   monitor for a second message broadcast by the second UE, wherein the second message includes information to establish the short range radio link and information about the second UE.

3. The circuitry of claim 2, wherein the processor circuitry is to execute the instructions to:
   select the second UE from among a plurality of UEs acting as relay nodes prior to establishing the short range radio link with the second UE.

4. The circuitry of claim 1, wherein the processor circuitry is to execute the instructions to:
   control transmission of data to be relayed to the cellular network via the short range radio link with the second UE and the cellular radio link between the second UE and the base station.

5. The circuitry of claim 1, wherein the processor circuitry is to execute the instructions to:
   generate signal strength measurements for the short range radio link based on receipt of the message.

6. The circuitry of claim 1, wherein the message is a first message, and the processor circuitry is to execute the instructions to:
   control receipt of a third message from a network element, wherein the third message is to indicate radio parameters or frequency bands to be used for establishment of the short range radio link.

7. The circuitry of claim 1, wherein the information is associated with a location of the first UE or a location of the second UE.

8. The circuitry of claim 1, wherein the cellular radio link comprises Evolved Universal Mobile Telecommunications System Terrestrial Radio Access Network (E-UTRAN) signaling, and the short range radio link comprises E-UTRAN short range signaling, wireless local area network (WLAN) signaling, or Bluetooth signaling.

9. The circuitry of claim 1, wherein the processor circuitry is to execute the instructions to control storage of the information included in the obtained message in a data structure that is to store information about UEs that operate as relay UEs.

10. An apparatus to be implemented in a first user equipment (UE), the apparatus comprising:
    processor circuitry coupled with memory circuitry, the processor circuitry to execute instructions to identify, based on information included in an obtained message, a second UE that is to act as a relay node, wherein the second UE acting as the relay node is to provide cellular network connectivity to the first UE through the second UE and a cellular radio link between the second UE and a base station; and
    short range radio access technology (RAT) circuitry, coupled with the processor circuitry, the short range RAT to:
       establish a short range radio link with the second UE to obtain the cellular network connectivity through the second UE, and
       transmit, to the second UE over the short range radio link, data to be relayed into the cellular network.

11. The apparatus of claim 10, wherein the message is a first message, and the processor circuitry is to execute the instructions to:
    monitor for a second message broadcast by the second UE, wherein the second message includes information to establish the short range radio link and information about the second UE.

12. The apparatus of claim 11, wherein the processor circuitry is to execute the instructions to:
    select the second UE from among a plurality of UEs acting as relay nodes prior to establishing the short range radio link with the second UE.

13. The apparatus of claim 10, wherein the processor circuitry is to execute the instructions to:
    generate signal strength measurements for the short range radio link based on receipt of the message.

14. The apparatus of claim 10, wherein the message is a first message, and the processor circuitry is to execute the instructions to:
    control receipt of a third message from a network element, wherein the third message is to indicate radio parameters or frequency bands to be used for establishment of the short range radio link.

15. The apparatus of claim 10, wherein the information is associated with a location of the first UE or a location of the second UE.

16. The apparatus of claim 10, wherein the cellular radio link comprises Evolved Universal Mobile Telecommunications System Terrestrial Radio Access Network (E-UTRAN) signaling, and the short range radio link comprises E-UTRAN short range signaling, wireless local area network (WLAN) signaling, or Bluetooth signaling.

17. The apparatus of claim 10, wherein the processor circuitry is to execute the instructions to control storage of the information included in the obtained message in a data structure that is to store information about UEs that operate as relay UEs.

18. One or more non-transitory computer-readable media (CRM) having instructions wherein execution of the instructions by one or more processors is to cause a first user equipment (UE) to:
    identify, based on information contained in an obtained message, a second UE that is to act as a relay node, wherein the second UE acting as the relay node is to provide cellular network connectivity to the first UE through the second UE and a cellular radio link between the second UE and a base station;

establish a short range radio link with the second UE to obtain the cellular network connectivity through the second UE; and control transmission, over the short range radio link, of data to be relayed to the cellular network via the cellular radio link between the second UE and the base station.

19. The one or more non-transitory CRM of claim 18, wherein the message is a first message and the information is first information, and wherein execution of the instructions is to cause the first UE to:

monitor for a second message broadcast by the second UE, wherein the second message includes information to establish the short range radio link and information about the second UE.

20. The one or more non-transitory CRM of claim 19, wherein execution of the instructions is to cause the first UE to:

select the second UE from among a plurality of relay UEs prior to establishing the short range radio link with the second UE.

21. The one or more non-transitory CRM of claim 18, wherein execution of the instructions is to cause the first UE to:

generate signal strength measurements for the short range radio link based on receipt of the message.

22. The one or more non-transitory CRM of claim 18, wherein the message is a first message, and wherein execution of the instructions is to cause the first UE to:

control receipt of a third message from a network element, wherein the third message is to indicate radio parameters or frequency bands to be used for establishment of the short range radio link.

23. The one or more non-transitory CRM of claim 18, wherein the information is associated with a location of the first UE or a location of the second UE.

24. The one or more non-transitory CRM of claim 18, wherein the cellular radio link comprises Evolved Universal Mobile Telecommunications System Terrestrial Radio Access Network (E-UTRAN) signaling, and the short range radio link comprises E-UTRAN short range signaling, wireless local area network (WLAN) signaling, or Bluetooth signaling.

25. The one or more non-transitory CRM of claim 18, wherein execution of the instructions by the one or more processors is to cause the first UE to control storage of the information included in the obtained message in a data structure that is to store information about UEs that operate as relay UEs.

* * * * *